ered Stof

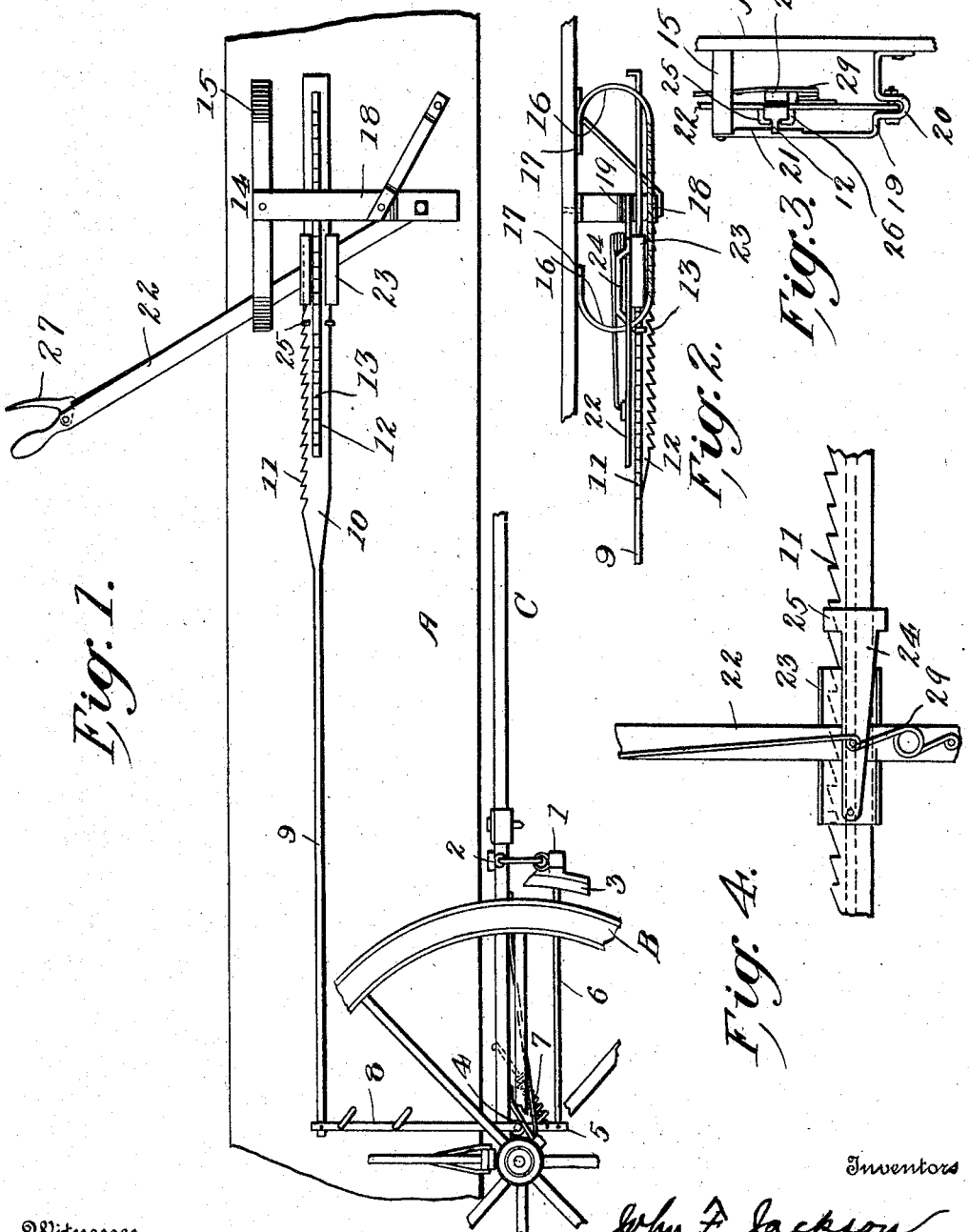

UNITED STATES PATENT OFFICE.

JOHN F. JACKSON, OF GRANGEVILLE, AND HENRY TAMM, OF MACE, IDAHO.

WAGON-BRAKE.

981,088.   Specification of Letters Patent.   Patented Jan. 10, 1911.

Application filed February 17, 1910. Serial No. 544,390.

*To all whom it may concern:*

Be it known that we, JOHN F. JACKSON, of Grangeville, in the county of Idaho and State of Idaho, and HENRY TAMM, of Mace, in the county of Shoshone and State of Idaho, both citizens of the United States, have invented certain new and useful Improvements in Wagon-Brakes, of which the following is a specification.

Our invention relates to brakes used on wagons to be operated from the forward end of the wagon and has for one of its objects the provision of a construction by which the brakes can be operated, after the blocks have worn down by use, with the lever ordinarily employed.

Another object of our invention is the provision of a brake constructed so that the brake block may be gradually tightened by a step by step movement of the block without releasing the block from the wheel when swinging the lever back to obtain a fresh hold for further compression.

A further object of our invention is the provision of a construction by which the brake blocks may be withdrawn an extraordinary distance from the wheel rim, out of the way of the heavy "dobe" mud encountered in some localities so that the wheels will not become clogged by the mud interfering with the brake blocks and beam.

Our invention will be described in detail hereinafter and illustrated in the accompanying drawings in which—

Figure 1 is a side view of a fragment of a wagon showing our improved brake in position thereon, Fig. 2, a top view of the operating mechanism, Fig. 3, a front end view, and Fig. 4, a detail view of the operating mechanism.

In the drawings similar reference characters indicate corresponding parts in all of the views.

A indicates the wagon body, B a rear wheel and C the reach. The brake beam 1 is supported in the usual manner from a cross bar 2 secured to the reach C and has the brake blocks 3 secured thereto. The operating shaft 4 is journaled on the reach C in the rear of brake beam 1, as shown, and has one or more downwardly extending arms 5 connected to the brake beam 1 by means of rods 6. 7 indicates a spring to hold the shaft 4 in such a position that the brake blocks 3 do not engage the rear wheel B.

8 indicates an arm extending upwardly from the end of shaft 4 and having the operating rod 9 pivotally secured to its upper end. The forward end of rod 9 is relatively wider and flat as shown at 10 and has its upper edge provided with ratchet teeth 11 while the outer face of the flat portion 10 has a horizontally disposed rib or spine 12 secured thereto and projecting therefrom and also provided with ratchet teeth 13 in its outer edge.

14 indicates a frame consisting of a bar 15 having its two ends bent inwardly at 16 and secured to the wagon body A, as shown at 17, and a bar 18 secured to the outer portion of bar 15 and extended downwardly and then horizontally inwardly as shown at 19 and secured to the body A, the horizontal portion 19 being formed with a loop 20 while the vertical portion of said bar 18 is formed with an inwardly extended flange 21 to engage the ratchet teeth 13, when the brake is in operation, to hold the brake blocks 3 in engagement with wheels B. The operating lever 22 is fulcrumed in loop 20 and is pivotally secured to a sleeve 23 that is slidably mounted on the flat portion 10 of rod 9.

24 indicates an arm pivotally secured to sleeve 23, bent around lever 22 and having its end formed with an upwardly extending hook-shaped catch 25 that engages the ratchet teeth 11, and an oppositely disposed hook 26 that engages the lower edge of flat portion 10 to limit the upward swing of the arm 24.

27 indicates an angular lever pivotally secured to the lever 22 and 28 a rod connecting the lever 27 and arm 24. 29 indicates a spring link secured at one end to lever 22 and at its other end to arm 24 to hold the catch 25 normally in engagement with the ratchet teeth 11.

In operation the spring 7 is strong enough to hold the brake beam 1 ordinarily in its forwardmost position and draw the rod 9 with the lever 22 back when the teeth 13 are disengaged from flange 21. To operate the brake the lever 22 is swung forwardly, the catch 25 engaging the ratchet teeth 11 draws the bar 9 forwardly and the brake beam and blocks 3 are swung to engage wheels B. When the lever 22 has swung as far forwardly as it will go the front end 10 of the bar 9 is pressed outwardly so that one of the teeth of ratchet 13 engages the flange 21. The lever 22 may then be swung backwardly so that the catch 25 will engage another tooth of ratchet 10 when the operation may be repeated. To release the brakes the ratchet 13 is disengaged from flange 21 and the lever 22 swung backwardly. At the same time the lever 27 is swung so as to lift the catch 25 from engagement with teeth 11 and the rod 9 is then free to move so that the brake beam 1 may be moved to its forwardmost position by spring 7. It will be apparent that this structure permits the brake beam to be swung to a distance from the wheels B to prevent the wheels and brake shoes from becoming clogged with mud, also that the compression of the brake shoes on the wheels may be increased by swinging back the lever without losing the compression secured by the initial operations of the lever, and furthermore for ordinary use our improved brake operating mechanism may be used as a single swing lever to catch 25 being used to shorten the rod 9 as the face of the brake blocks wear down by use.

Having thus described our invention what we claim is—

1. A brake operating mechanism comprising in combination with an operating lever, an operating brake rod, means secured to the rod to hold the brake in a clamping position, an automatically adjustable grip device to engage the brake rod, and means secured to the lever to adjust said grip device.

2. A brake operating mechanism comprising in combination with an operating lever, a brake rod having ratchet teeth, a sleeve secured to the lever and slidably mounted on said rod and teeth, an arm pivotally secured to the sleeve and having a catch thereon to engage the ratchet teeth, means secured to the lever to actuate said arm and catch, and mechanism to hold the rod in a position to set the brakes.

3. A brake operating mechanism comprising in combination with an operating lever, a brake rod having ratchet teeth, a sleeve secured to the lever and slidably mounted on said rod and teeth, an arm pivotally secured to the sleeve and having a catch thereon to engage the ratchet teeth, means secured to the lever to actuate said arm and catch, another ratchet secured to the rod, and means to engage the last mentioned ratchet to hold the brakes set.

4. A brake operating mechanism comprising in combination with a wagon body, a brake operating mechanism mounted thereon consisting of a frame, a lever fulcrumed on said frame, a sleeve pivotally secured to the lever, the brake operating rod slidably mounted in said sleeve, and having ratchet teeth thereon, an arm pivotally secured to the sleeve and having a catch to engage said ratchet teeth, an angular lever pivotally secured to the first mentioned lever, a rod connecting said angular lever and the arm aforesaid, a spring link secured to the first mentioned lever and the arm, and means to hold the brake operating rod in position to set the brakes.

5. A brake operating mechanism comprising in combination with a wagon body, a brake operating mechanism mounted thereon consisting of a frame, a lever fulcrumed on said frame, a sleeve pivotally secured to the lever, the brake operating rod slidably mounted in said sleeve and having ratchet teeth thereon, an arm pivotally secured to the sleeve and having a catch to engage said ratchet teeth, an angular lever pivotally secured to the first mentioned lever, a rod connecting said angular lever and the arm aforesaid, a spring link secured to the first mentioned lever and the arm, a rib or spine projecting laterally from the rod and having ratchet teeth on its free edge, and a flange extended inwardly from said frame to engage the last mentioned ratchet and hold the brake operating rod in position to set the brakes.

In testimony whereof we hereto affix our signatures in the presence of witnesses.

JOHN F. JACKSON.
HENRY TAMM.

Witnesses as to John F. Jackson:
 Asa S. Hardy,
 Pearl A. Wright.
Witnesses as to Henry Tamm:
 Lewis H. Hays,
 Philip Dube.